Patented Mar. 20, 1928.

1,663,128

UNITED STATES PATENT OFFICE.

RALPH V. HEUSER, OF ELIZABETH, NEW JERSEY, ASSIGNOR TO AMERICAN CYANAMID COMPANY, OF NEW YORK, N. Y., A CORPORATION OF MAINE.

GUANIDINE COMPOUND.

No Drawing.     Application filed April 24, 1926.  Serial No. 104,476.

This invention relates to nitrogen compounds, more particularly to compounds of substituted guanidines and carbon disulphide, it being among the objects of this invention to produce substances of this character having useful properties.

I have discovered that substituted guanidines may be caused to react with carbon disulphide to form substances which, after being subjected to oxidation, have properties which render them eminently suitable for use as vulcanization accelerators in the vulcanization of rubber products. Although I may use various substituted guanidines in practicing my invention, I prefer to use mixed alkyl-aryl guanidines, such as alpha-ethyl-alpha-phenyl-guanidine, which is caused to react with carbon disulphide under controlled conditions, as shown by the following equation:

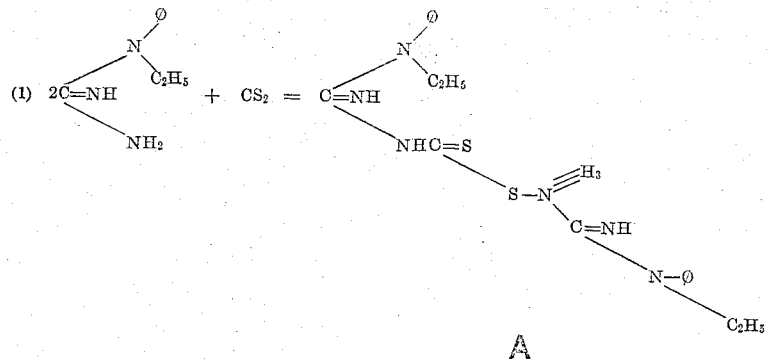

This intermediate product A is then treated with a mild oxidizing agent, such as hydrogen peroxide to give the final product, as follows:

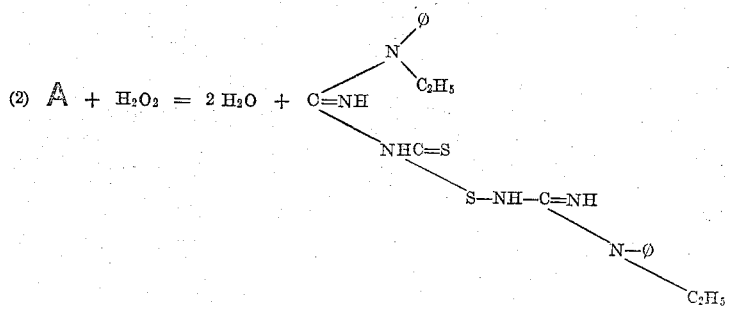

which may be considered to be di-alpha-ethyl-di-alpha-phenyl-diguanyl-carbodisulphide.

The method followed in making my new products is exemplified by the method used to produce the above named compound. Alpha-ethyl-alpha-phenyl-guanidine was dissolved in sulphuric ether, an amount of carbon disulphide about 10% to 15% in excess of the theoretical was added and the mixture continually stirred, being maintained cool by means of an ice bath. After about one hour the ether was evaporated on a warm water bath and the residue was dissolved in water, forming a clear solution of yellow color, and leaving a small amount of insoluble matter. The aqueous extract was treated with activated carbon, filtered, and to the filtrate there was added a hydrogen peroxide solution, forming a thick, curdy precipitate, which was filtered, washed with water and dried in a vacuum.

The product was a fine, white powder, having a melting point of 193°–194.5° C., and containing 21.09% of nitrogen and 15.42% of sulphur. This corresponds very closely with the values calculated for the compound di-alpha-ethyl-di-alpha-phenyl-diguanyl-carbodisulphide which are 21.0% of nitrogen and 16.0% of sulphur, having most probably the structural formula given in equation (2). During the treatment of the soluble dithiocarbamate, formed in the reaction of equation (1), with an oxidizing agent it appears that two hydrogen atoms attached to the pentavalent nitrogen atom are removed, causing the nitrogen atom to become trivalent and changing the nature of the compound from the type of the soluble salt of dithiocarbamic acid to an insoluble compound in which two guanyl radicles are linked together by the group:

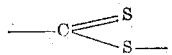

When tested for its curing power in vulcanization it proved to be a very strong accelerator. Test pieces of vulcanized rubber made with the above compound and with diphenylguanidine (D.P.G.) and di-o-tolylguanidine (D.O.T.G.) for comparison showed that the new product is approximately twice as effective as di-o-tolylguanidine and 2.6 times as effective as diphenylguanidine.

Although I have described my invention giving a specific example of the class of substances included therein, the invention is not limited thereto as other substituted guanidines, such as guanidines containing other alkyl and aryl groups than ethyl and phenyl, may be substituted therefor. Various changes may be made in the method followed, for instance, reaction (1) may be caused to take place in some other solvent than ether, such as water, or in the absence of any solvent whatsoever, and other oxidizing agents and means may replace the hydrogen peroxide used. These and other changes may be made in my invention, the scope of which is defined in the claims appended hereto.

What I claim is:

1. A composition of matter comprising the oxidized product of the reaction between a substituted guanidine having at least one unsubstituted amino hydrogen and carbon disulphide.

2. A composition of matter comprising the oxidized product of the reaction between a di-substituted guanidine having at least one unsubstituted amino hydrogen and carbon disulphide.

3. A composition of matter comprising the oxidized products of the reaction between an alkyl-aryl substituted guanidine having at least one unsubstituted amino hydrogen and carbon disulphide.

4. A composition of matter comprising the oxidized product of the reaction between an ethyl-phenyl substituted guanidine having at least one unsubstituted amino hydrogen and carbon disulphide.

5. A composition of matter comprising the oxidized product of the reaction between alpha-ethyl-alpha-phenyl guanidine and carbon disulphide.

6. A composition of matter comprising diethyl-diphenyl-diguanyl-carbodisulphide.

7. A composition of matter comprising the oxidized product of the reaction between an alkly-aryl substituted guanidine and carbon disulphide having most probably the following structural formula:

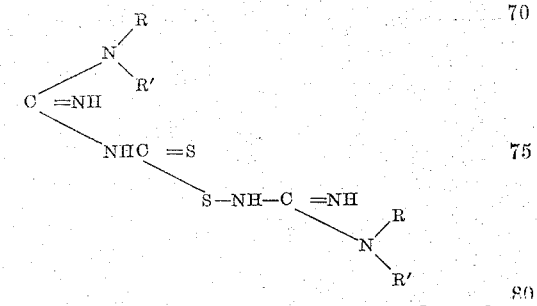

where R and R' designate alkyl and aryl groups respectively.

8. A composition of matter comprising diethyl-diphenyl-diguanyl-carbodisulphide having most probably the following structural formula where $\phi$ indicates a phenyl group:

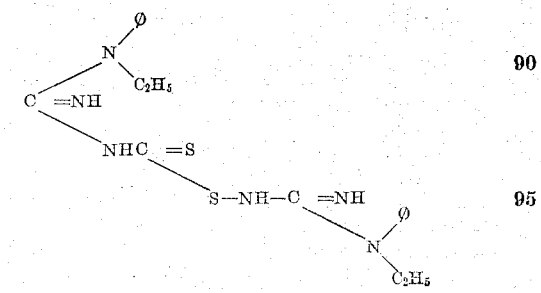

In testimony whereof, I have hereunto subscribed my name this 22d day of April, 1926.

RALPH V. HEUSER.